US006885558B2

(12) United States Patent
Yokote et al.

(10) Patent No.: US 6,885,558 B2
(45) Date of Patent: Apr. 26, 2005

(54) ELECTRONIC APPARATUS HAVING HOUSING TO CONTAIN COMPONENTS AND DOOR SUPPORTED BY HOUSING

(75) Inventors: Satoshi Yokote, Ome (JP); Atsuhiro Yanagida, Hamura (JP); Takahiro Fujii, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/787,761

(22) Filed: Feb. 27, 2004

(65) Prior Publication Data

US 2004/0184245 A1 Sep. 23, 2004

(30) Foreign Application Priority Data

Feb. 28, 2003 (JP) .................................... 2003-053052

(51) Int. Cl.[7] .......................... H05K 5/00; H05K 7/00; G06F 1/16
(52) U.S. Cl. .................. 361/732; 361/685; 361/727; 361/740; 361/747; 361/759; 361/752; 361/801; 361/802
(58) Field of Search .................. 361/683–686, 361/724–728, 801–802, 785, 732, 740–741, 747, 752, 756, 759, 796

(56) References Cited

U.S. PATENT DOCUMENTS

| | | | | |
|---|---|---|---|---|
| 5,162,976 A | * | 11/1992 | Moore et al. | 361/683 |
| 6,377,448 B1 | * | 4/2002 | Liu et al. | 361/685 |
| 6,512,671 B1 | * | 1/2003 | Okano et al. | 361/686 |
| 2003/0053291 A1 | | 3/2003 | Yanagida | |

FOREIGN PATENT DOCUMENTS

| | | |
|---|---|---|
| JP | 2002-278653 | 9/2002 |
| JP | 2002-280778 | 9/2002 |

\* cited by examiner

Primary Examiner—Phuong T. Vu
(74) Attorney, Agent, or Firm—Pillsbury Winthrop, LLP

(57) ABSTRACT

An electronic apparatus has a housing having one end, components contained in the housing, and a door which is lockable at a closed position to hide one end of the housing. The housing has a base to support the door, and a cover connected removable to the base. The cover is removed from the base by sliding toward the door, and hooked on the base by sliding away from the door. The door prevents the cover from sliding in the direction of separating the cover from the base, as long as being locked at the closed position.

17 Claims, 5 Drawing Sheets

ELECTRONIC APPARATUS HAVING HOUSING TO CONTAIN COMPONENTS AND DOOR SUPPORTED BY HOUSING

CROSS-REFERENCE TO RELATED APPLICATIONS

This application is based upon and claims the benefit of priority from the prior Japanese Patent Application No. 2003-053052, filed Feb. 28, 2003, the entire contents of which are incorporated herein by reference.

BACKGROUND OF THE INVENTION

1. Field of the Invention

The present invention relates to an electronic apparatus which has a housing to contain components such as a hard disk drive, and more particularly, to the structure of the housing.

2. Description of the Related Art

Jpn. Pat. Appln. KOKAI Publications No. 2002-278653 and No. 2002-280778 disclose an electronic apparatus like a server which handles a large amount of data. This electronic apparatus has a box-like housing. The housing contains various components such as a printed circuit board mounted with a CPU and a memory, a CD-ROM drive and a hard disk drive. The CD-ROM drive and hard disk drive are placed at the front end of the housing. On the front surface of the housing, openings are formed for inserting/removing an optical disk or storing an additional hard disk drive.

An electronic apparatus of this type has a front door at the front end of the housing to intensity security. The front door is movable rotationally between the closed position to hide the front surface of the housing, and the opened position to expose the front surface of the housing. The front door is lockable at the closed position through a lock device. When the front door is locked at the closed position, the front door hides the openings in the front surface of the housing. Therefore, a third party cannot illegally access the inside CD-ROM drive and hard disk drive.

The housing of the electronic apparatus has a base and a cover. The base has a bottom plate, a pair of side plates, a front plate and a rear plate. Components such as the hard disk drive are housed in the area enclosed by the bottom plate, side plates, front plate and rear plate. The cover extends over the side plates, front plate and rear plate, hiding the components from above. The cover is fixed to the upper ends of the side plates through a plurality of screws.

In the conventional housing, the cover to hide the inside components is merely fixed to the base through a plurality of screws. Thus, anyone can easily remove the cover by resetting the fixation of the cover by loosening the screws, and can easily access the components inside of the housing. Therefore, it is impossible to prevent theft of components and outflow of important data merely by locking the front door at the closed position.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the embodiments given below, serve to explain the principles of the invention.

DETAILED DESCRIPTION OF THE INVENTION

An embodiment of the present invention will be explained hereinafter with reference to FIG. 1 to FIG. 7.

Figure 1:
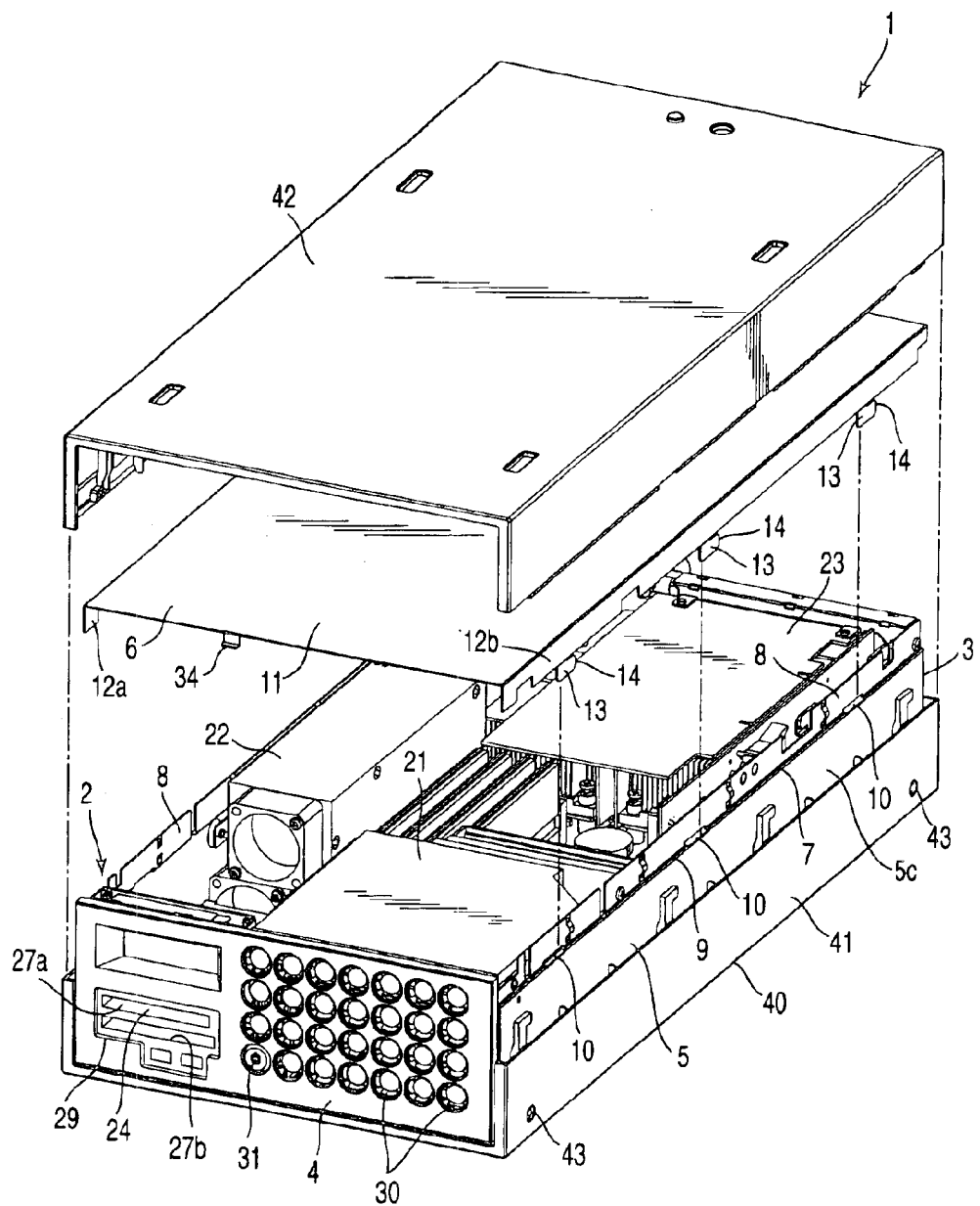
FIG. 1 is a perspective view of a server according to an embodiment of the present invention, showing the front view of a housing with a top cover removed from a base.
Figure 2:
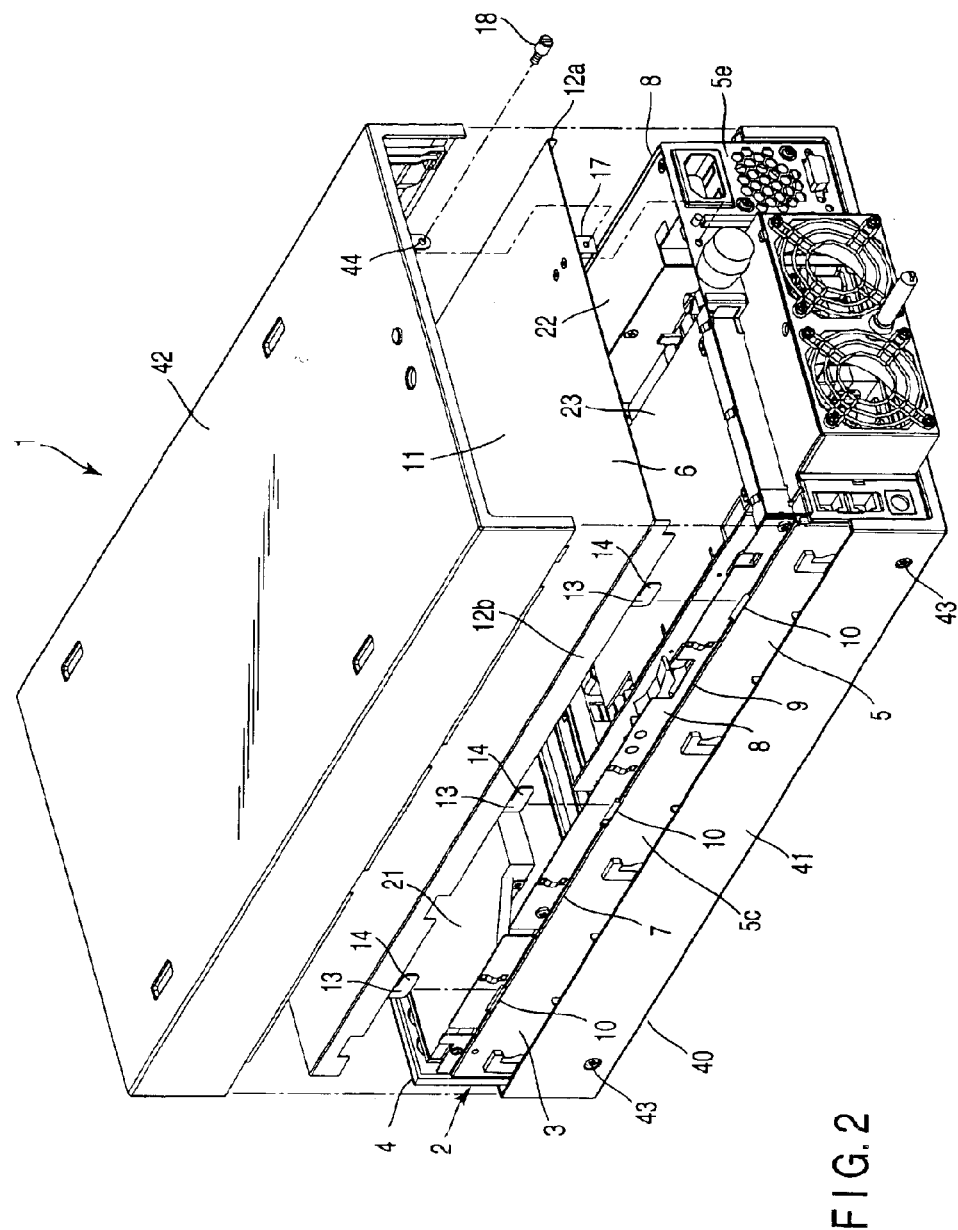
FIG. 2 is a perspective view of the server according to the embodiment of the present invention, showing the rear view of the housing with the top cover removed from the base.
Figure 3:
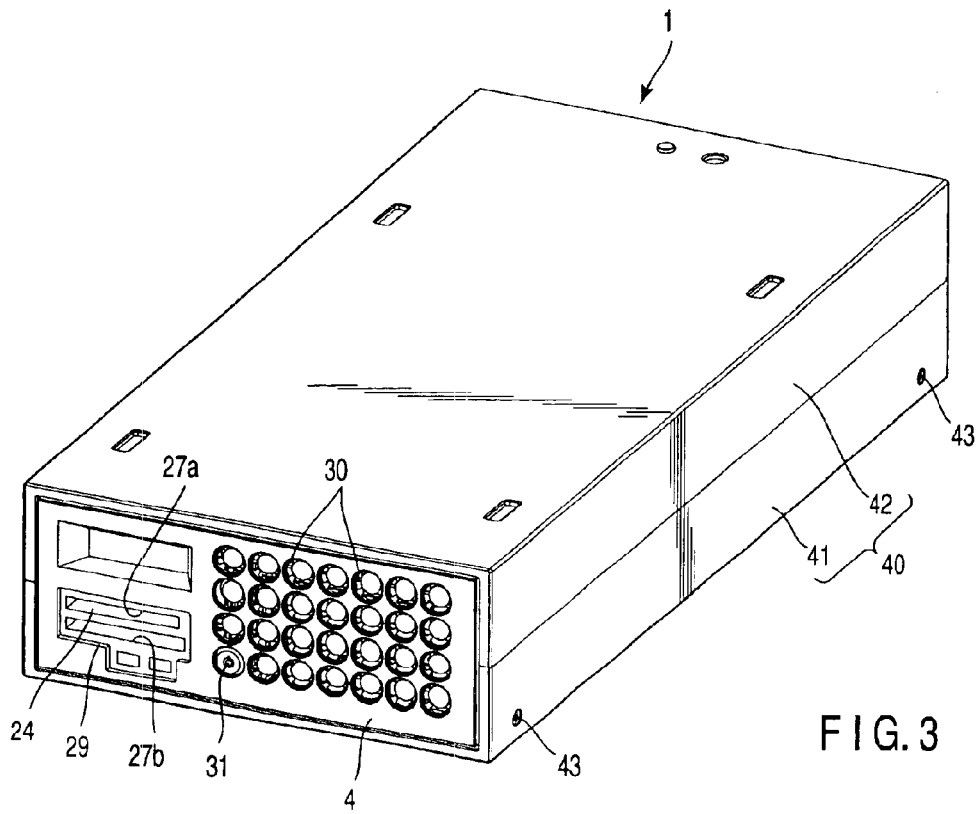
FIG. 3 is a perspective view of the server according to the embodiment of the present invention.

FIG. 1 to FIG. 3 show a server 1 as an electronic apparatus. The server 1 has a main body 2. The main body 2 comprises a hollow box like housing 3 and a front door 4.

The housing 3 has a base 5 and a top cover 6. The base 5 and top cover 6 are made of metal plate. The base 5 has a rectangular bottom plate 5a, left and right side plates 5b and 5c, a front plate 5d, and a rear plate 5e. The side plates 5b and 5c, front plate 5d and rear plate 5e are raised from the edge of the bottom plate 5a. The side plates 5b and 5c are located opposite to each other in the width direction of the base 5.

Figure 4:
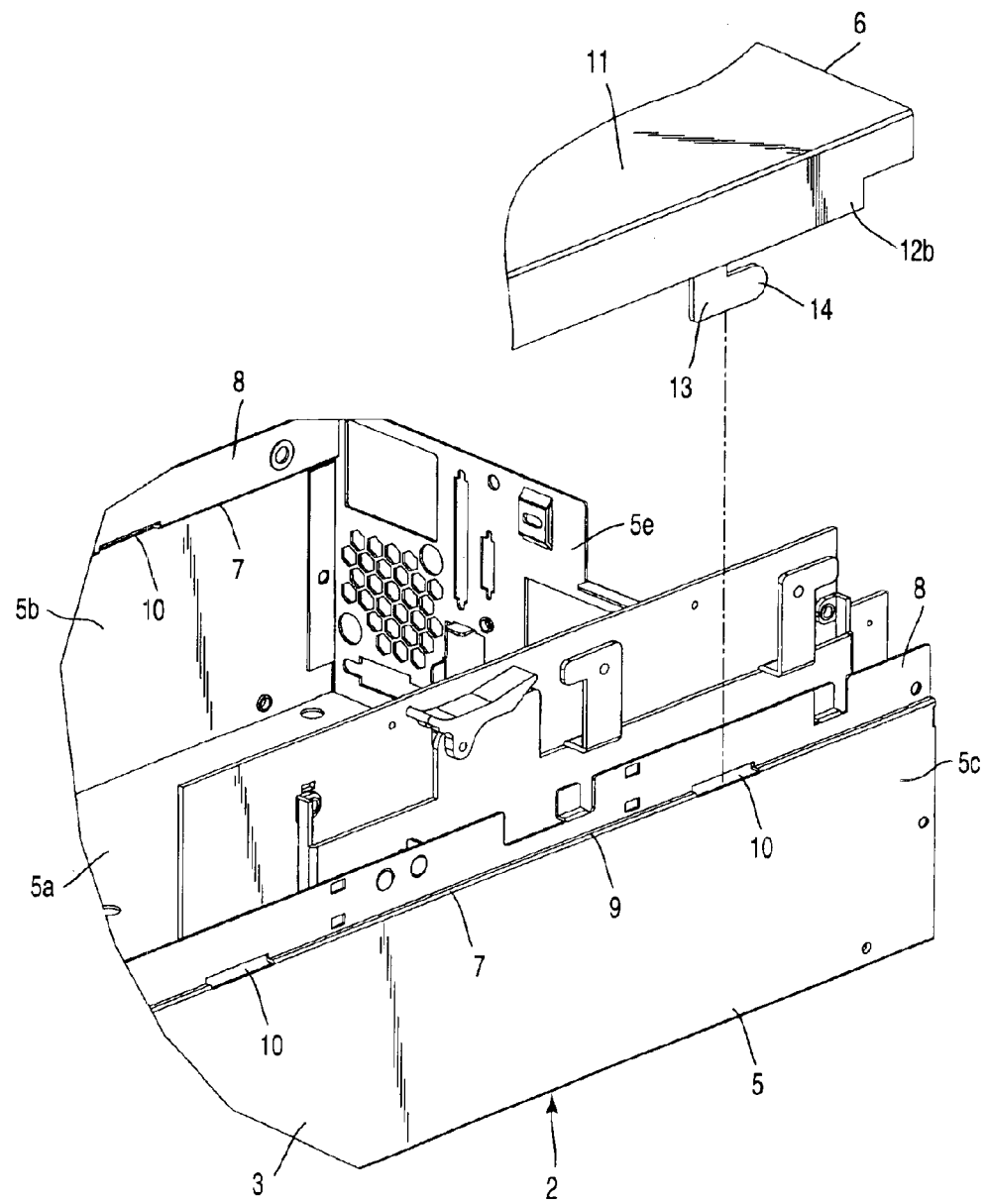
FIG. 4 is a perspective view of the server according to the embodiment of the present invention, showing the positional relationship between engagement holes of the base and engagement pieces of the top cover.

As shown in FIG. 4, a staged part 7 and a flange 8 are formed at the upper ends of the side plates 5b and 5c, respectively. The staged part 7 is bent a little like a crank toward the inside of the housing 3. The staged part 7 has an edge 9 and a plurality of engagement holes 10. The edge 9 extends straight toward the depth of the housing 3. The engagement holes 10 are shaped like a slit, and arranged with spaces toward the depth of the housing 3. The flange 8 extends upward from the staged part 7. The flanges 8 are formed closer to the housing 3 than the side plates 5b and 5c by the width of the edge 9.

The top cover 6 has a rectangular ceiling board 11. The ceiling board 11 extends over the side plates 5b and 5c, front plate 5d and rear plate 5e. Flanges 12a and 12b are formed bent downward at the left and right edges of the ceiling board 11. The flanges 12a and 12b are fit over the flanges 8 of the side plates 5b and 5c. The lower edges of the flanges 12a and 12b butt against the edges 9 of the staged parts 7.

Figure 5:
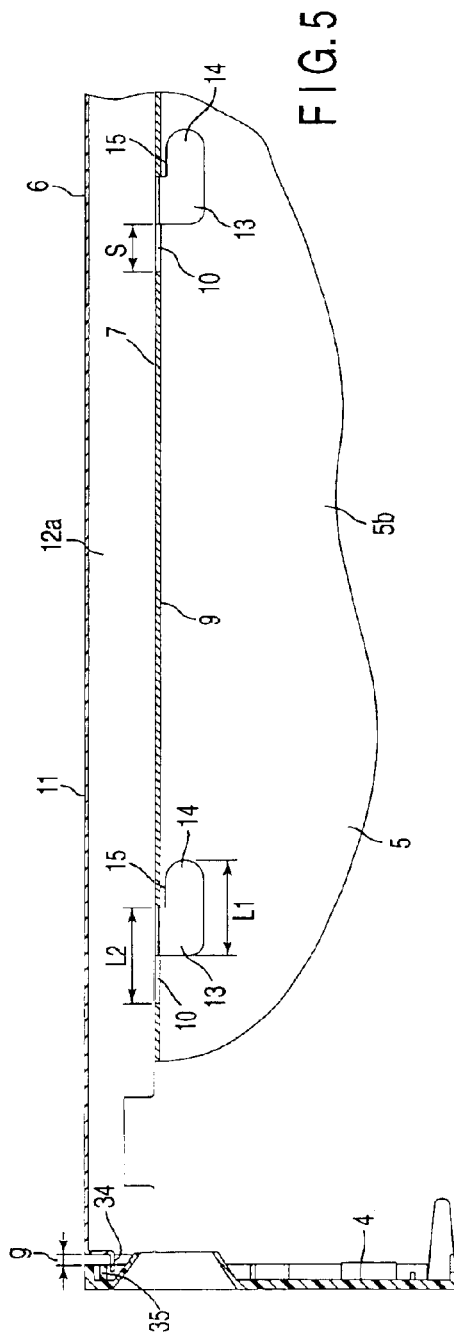
FIG. 5 is a sectional view showing the positional relationship between the top cover slid to a first position and a front door locked at a closed position in the embodiment of the present invention.

As shown in FIG. 1 and FIG. 2, a plurality of engagement pieces 13 are formed at the lower edges of the flanges 12a and 12b of the top cover 6. The engagement pieces 13 are inserted removably into the engagement holes 10 of the base 5. The engagement pieces 13 are extended downward from the lower edges of the flanges 12a and 12b, and aligned with spaces toward the depth of the ceiling board 11. As shown in FIG. 5, each engagement piece 13 has an extension 14 extending along the lower edges of the flanges 12a and 12b. The extension 14 projects in the direction of separating from the front plate 5d of the base 5, while the engagement piece 13 is being inserted into the engagement hole 10. The length L1 of the engagement piece 13 including the extension 14 is a little shorter than the length L2 of the engagement hole 10. In addition, slit-like grooves 15 are formed between the extensions 14 and the lower edges of the flanges 12a and 12b.

To mount the top cover 6 on the base 5, first insert the engagement pieces 13 of the top cover 6 into the engagement holes 10. Then, the flanges 12a and 12b of the top cover 6 are overlaid on the flanges 8 of the base 5, and the lower edges of the flanges 12a and 12b butt against the edges 9 of the staged parts 7.

Then, slide the top cover 6 away from the front plate 5d of the base 5. By this sliding operation, the extensions 14 of the engagement pieces 13 are inserted into the lower parts of the edges 9 of the staged parts 7 and the edges 9 are fit in the grooves 15. In other words, the edges 9 are held between the lower edges of the flanges 12a, 12b and the extensions 14, and the top cover 6 is connected removably to the base 5. Thus, the top cover 6 is mounted movable between a first position (shown in FIG. 6) where the extensions 14 of the engagement pieces 13 faces to the engagement holes 10 of the base 5, and a second position (shown in FIG. 5) where the extensions 14 are hooked on the opening edges of the engagement holes 10 of the staged parts 7.

A tongue piece 17 is formed at the rear edge of the ceiling board 11, as shown in FIG. 2. The tongue piece 17 is overlaid on the rear plate 5e of the base 5 when the top cover 6 is mounted on the base 5. At the same time, the tongue piece 17 is fixed to the rear plate 5e through a screw 18. By this fixation, the connection of the base 5 and top cover 6 is held, and the movement of the top cover 6 in the direction of disengaging the engagement pieces 13 from the engagement holes 10 is prevented.

As shown in FIG. 1 and FIG. 2, the housing 3 contains various components such as a CD-ROM drive 21, a power supply unit 22, an extension board 23 and a hard disk drive (not shown). The components 21–23 are supported by the base 5, and surrounded by the side plates 5b and 5c, front plate 5d and rear plate 5e. The top cover 6 of the housing 3 hides the components 21–23, by cooperating with the base 5.

Figure 7:
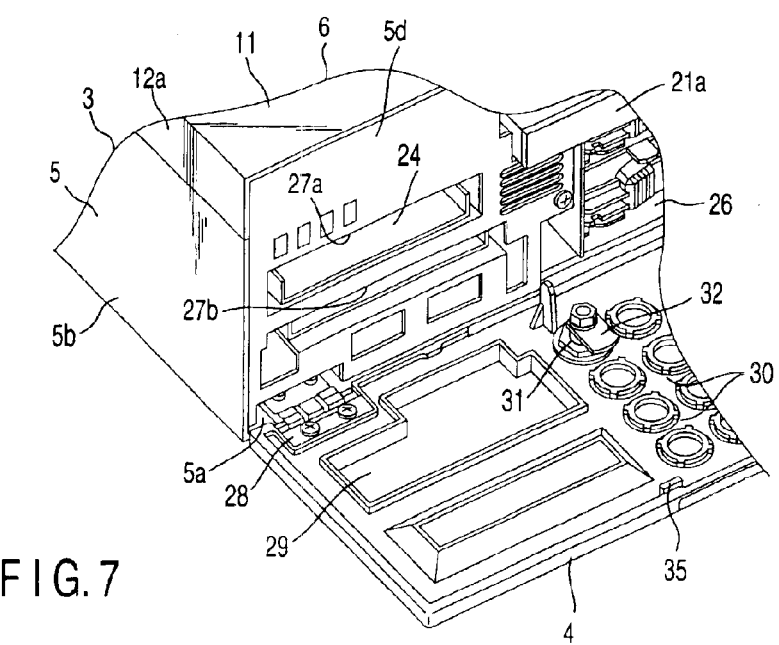
FIG. 7 is a perspective view of the server with the front door moved to an opened position in the embodiment of the present invention.

As shown in FIG. 7, a card receptacle 24 is installed inside of the housing 3. The card receptacle 24 is used to receive a plurality of PC cards (not-shown). The card receptacle 24, CD-ROM drive 21 and hard disk drive are placed at the front end of the housing 3. Thus, the front wall 5d of the housing 3 is provided with an opening 26 to insert and remove a tray 21a of the CD-ROM drive 21 and hard disk drive, and a plurality of card slots 27a and 27b to insert and remove the PC cards into/from the card receptacle 24.

The front door 4 is rectangular and sized corresponding to the front plate 5d of the base 5. The front door 4 is supported by the front end of the bottom plate 5a of the base 5 through a hinge 28, and movable rotationally between a closed position and an opened position. At the closed position, the front door 4 rises to hide the front plate 5d of the housing 3, and faces to the opening 26 and card slots 27a and 27b. At the opened position, the front door 4 falls down horizontally toward the front of the housing 3, exposing the front plate 5d, opening 26 and card slots 27a and 27d to the outside of the housing 3.

The front door 4 has a card insertion port 29 and a plurality of suction ports 30. The card insertion port 29 faces to the card slots 27a and 27b when the front door 4 is moved to the closed position. The suction ports 30 face to the opening 26 when the front door 4 is moved to the closed position.

The front door 4 has a lock cylinder 31 as a lock device. The lock cylinder 31 has a lock lever 32, as shown in FIG. 7. The lock lever 32 is movable rotationally between a locked position to hook on the front plate 5d of the base 5, and an unlocked position to separate from the front plate 5d. The lock lever 32 is operated by inserting a lock key held by an administrator who must manage the server 1 into the lock cylinder 31.

When the lock lever 32 is operated from the unlocked position to the locked position by using the lock key while the front door 4 is being at the closed position, the lock lever 32 hooks on the front plate 5d. By this operation, the front door 4 is locked at the closed position.

In the state that the front door 4 is being locked at the closed position as shown in FIG. 5, the inside surface of the front door 4 faces to the front edge of the ceiling board 11 of the top cover 6. A gap g is formed between the front door 4 and the front edge of the ceiling board 11. The gap g is smaller than the sliding amount S of the top cover 6 when sliding the engagement pieces 13 from the second position to the first position.

The ceiling board 11 of the top cover 6 has an engagement claw 34 projecting forward from the front edge. The front end of the engagement claw 34 is contacting or close to the inside surface of the front door 4 locked at the closed position. The front door 4 has a projection 35 which hooks on the engagement claw 34 from above when the front door 4 is moved to the closed position.

As a result, when the top cover 6 is slid from the second position toward the first position while the front door 4 is at the closed position, the front edge of the ceiling board 11 butts against the inside surface of the front door 4 before the top cover 6 reaches the first position. At the same time, since the projection 35 of the front door 4 hooks on the engagement claw 34 from above, it is impossible to raise the top cover 6 in the direction of disengaging the engagement pieces 13 from the engagement holes 10. Therefore, as long as the front door 4 is locked at the closed position, the door 4 prevents the top cover 6 from sliding in the direction of disengaging the engagement pieces 13 from the engagement holes 10.

As shown in FIG. 1 to FIG. 3, the housing 3 of the main body 2 is hidden by a face cover 40 made of synthetic resin. The face cover 40 has a first cover 41 and a second cover 42. The first cover 41 hides the lower halves of bottom plate 5a and side plates 5b and 5c of the base 5, and is fixed to the side plates 5b and 5c through a plurality of screws 43.

The second cover 42 hides the upper halves of the side plates 5b and 5c, and hooks on removably on the first cover 41. The second cover 42 has a tongue piece 44 at the rear edge. The tongue piece 44 is overlaid on the tongue piece 17 of the top cover 6, and is fixed to the rear plate 5e of the base 5 by utilizing the screw 18.

Explanation will now be given on the procedure of removing the top cover 6 from the base 5 in the server 1 configured as described above.

First, remove the screw 18, and release the fixation of the second cover 42 and top cover 6 to the base 5. Next, remove the second cover 42 from the first cover 41, and expose the top cover 6 of the housing 3.

Figure 6:
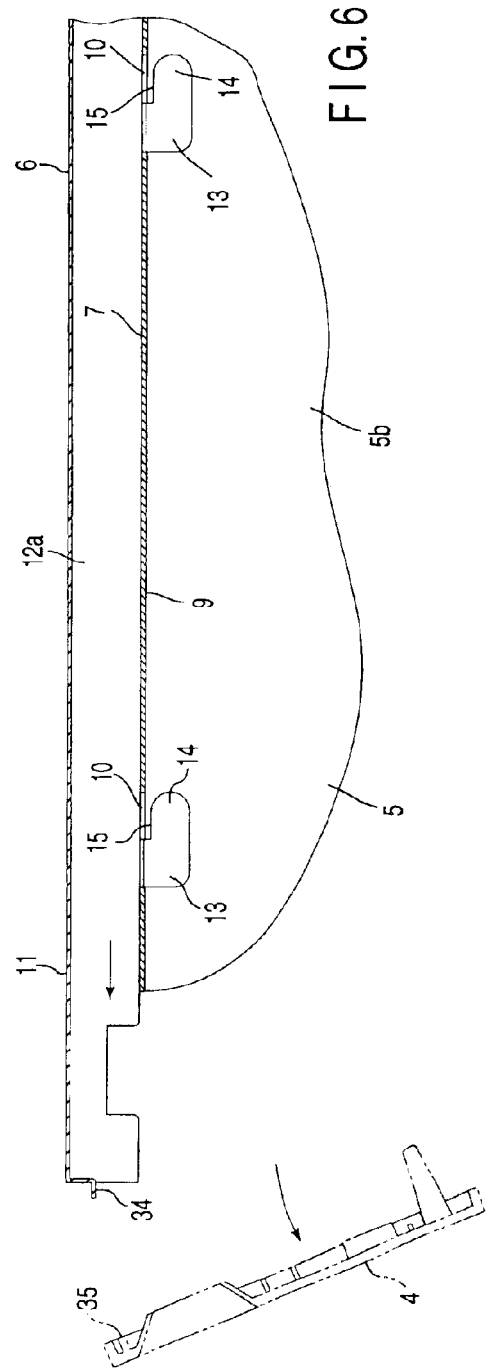
FIG. 6 is a sectional view showing the positional relationship between engagement pieces and engagement holes when the top cover is slid to a second position in the embodiment of the present invention.

Next, operate the lock lever 32 of the lock cylinder 31 in the unlocking direction from the lock position through the lock key, and unlock the front door 4. Then, the front door 4 can be moved rotationally from the closed position to the opened position. When the front door 4 is moved to the opened position as shown in FIG. 6, the front door 4 moves away from the front edge of the top cover 6, and the projection 35 of the front door 4 is disengaged from the engagement claw 34 of the top cover 6.

Next, slide the top cover 6 from the second position to the first position. By this sliding operation, the extensions 14 of the engagement pieces 13 faces to the engagement holes 10 of the base 5, as shown in FIG. 6, and the extensions 14 can be removed from the engagement holes 10. Finally, raise the top cover 6, and disengage the engagement pieces 13 from the engagement holes 10. Then, the removal of the top cover 6 is completed.

With this structure, even if the top cover 6 is tried to slide from the second position toward the first position in the state that the front door 4 is being locked at the closed position, the front edge of the top cover 6 butts against the front door 4 before the top cover 6 reaches the first position. Thus, the slide of the top cover 6 is restricted, and the extension 14 of the engagement pieces 13 are held in being hooked on the edges 9 of the staged parts 7.

At the same time, the projection 35 of the front door 4 is engaged with the engagement claw 34 at the locked position. Thus, it is impossible to raise the top cover 6 in the direction of disengaging the engagement pieces 13 from the engagement holes 10.

Therefore, as long as the front door 4 is locked at the closed position, the front door 4 is an obstacle to the removal of the top cover 6 from the base 5. As a result, it is impossible to expose components such as the CD-ROM drive 21 to the outside of the housing 3, and a third party cannot access components.

In other words, only the administrator holding the lock key or a person allowed by the administrator can remove the top cover 6. Therefore, it is prevented that a third party illegally takes out or operates the components inside of the housing 3. And, the security of the server 1 can be intensified.

An electronic apparatus according to the present invention is not limited to a server. It can also be embodied as other information apparatus such as a desktop personal computer.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a housing having one end;
   components contained in the housing; and
   a door supported by one end of the housing, the door movable between a closed position to hide one end of the housing and an opened position to expose one end of the housing, and locked at the closed position;
   wherein the housing has a base to support the door, and a cover connected removably to the base; the cover is removed from the base by sliding toward the door, and hooked on the base by sliding away from the door; and the door prevents the cover sliding away from the base, as long as being locked at the closed position.

2. The electronic apparatus according to claim 1, wherein the base has a plurality of engagement holes arranged with spaces in the direction of sliding the cover, the cover has a plurality of engagement pieces inserted into the engagement holes, and said each engagement piece has an extension projecting in the direction of separating from the door.

3. The electronic apparatus according to claim 2, wherein the extension of the engagement piece is hooked on the opening edge of the engagement hole when the cover is slid away from the door in the state that the engagement piece is inserted into the engagement hole.

4. The electronic apparatus according to claim 2, wherein the cover is supported slidable by the base between a first position where the extension of the engagement piece faces the engagement hole, and a second position where the extension of the engagement pieces is hooked on the opening edge of the engagement hole.

5. The electronic apparatus according to claim 2, wherein the base has a pair of side plates opposite to each other interposing the components therebetween, the engagement holes are aligned at the end of said each side plate, and the cover has a pair of flanges overlaid on the end of said each side plate, and the engagement pieces are formed in each of the flanges.

6. The electronic apparatus according to claim 1,
   wherein the cover is fixed to the base at the position out of the door through a screw.

7. The electronic apparatus according to claim 1,
   wherein the cover has an engagement claw at one end, and the engagement claw butts against the door locked at the closed position before the cover is removed from the base, when the cover is slid toward the door.

8. The electronic apparatus according to claim 7,
   wherein the door has a projection which hooks on the engagement claw of the cover at the closed position.

9. The electronic apparatus according to claim 1,
   further comprising a lock device which locks the door at the closed position.

10. The electronic apparatus according to claim 1,
    further comprising a face cover which hides the housing, the face cover having a first cover fixed to the base, and a second cover which is supported removable by the first cover and hides at least the cover.

11. An electronic apparatus comprising:
    a housing having an opening at one end;
    components contained in the housing; and
    a door supported by one end of the housing, the door movable between a closed position to hide the opening and an opened position to expose the opening, and locked at the closed position through a lock device;
    wherein the housing has a base to support the door, and a cover connected removably to the base; the cover has a plurality of engagement parts which are hooked on the base by sliding away from the door, and removed from the base by sliding toward the door; and the door prevents the cover from sliding in the direction of separating the engagement parts from the base, as long as being locked at the closed position.

12. The electronic apparatus according to claim 11, wherein the base has a plurality of engagement holes to insert the engagement parts removably.

13. The electronic apparatus according to claim 11, further comprising a face cover which hides the housing, the face cover having a first cover fixed to the base, and a second cover which is supported removable by the first cover and hides at least the cover.

14. The electronic apparatus according to claim 13, wherein the cover and second cover are fixed to the base through a common screw.

15. An electronic apparatus comprising:

a housing having one end;

components contained in the housing; and a door supported by one end of the housing, the door movable between a closed position to hide one end of the housing and an opened position to expose one end of the housing; and a lock device which locks the door at the closed position;

wherein the housing has a base to support the door, and a cover connected removably to the base; the cover has a plurality of engagement parts which are hooked on the base by sliding away from the door, and removed from the base by sliding toward the door; and the door prevents the cover from sliding in the direction of separating the engagement parts of the cover from the base, and has a projection which hooks on the cover, as long as being locked at the closed position.

16. The electronic apparatus according to claim 15, wherein the cover has an engagement claw which hooks on the projection of the door, when the door is at the closed position.

17. The electronic apparatus according to claim 16, wherein the engagement claw butts against the door locked at the closed position before the engagement parts of the cover are separated from the base, when the cover is slid toward the door.

* * * * *